United States Patent [19]

Gordon et al.

[11] Patent Number: 4,496,886
[45] Date of Patent: Jan. 29, 1985

[54] THREE STATE DRIVER FOR INDUCTIVE LOADS

[75] Inventors: Gary B. Gordon, Saratoga; Robert Joy, Mountain View; Michael J. Lee, Palo Alto, all of Calif.

[73] Assignee: Hewlett-Packard Company, Palo Alto, Calif.

[21] Appl. No.: 439,691

[22] Filed: Nov. 8, 1982

[51] Int. Cl.³ .......................... H02P 7/06; H02P 6/00
[52] U.S. Cl. ................... 318/254; 318/332; 318/373; 318/375; 318/678
[58] Field of Search ............... 318/317, 302, 332, 373, 318/375, 254, 254 A, 138, 439, 678, 693

[56] References Cited

U.S. PATENT DOCUMENTS

| | | | |
|---|---|---|---|
| 3,652,913 | 3/1972 | Leland | 318/678 |
| 4,066,945 | 1/1978 | Korte, Jr. | 318/678 X |
| 4,319,170 | 3/1982 | Brent | 318/258 X |
| 4,347,464 | 8/1982 | Park et al. | 318/439 X |

FOREIGN PATENT DOCUMENTS

| | | | |
|---|---|---|---|
| 54-110414 | 8/1979 | Japan | 318/317 |
| 56-49691 | 5/1981 | Japan | 318/317 |
| 57-16591 | 1/1982 | Japan | 318/317 |

Primary Examiner—J. V. Truhe
Assistant Examiner—Bentsu Ro
Attorney, Agent, or Firm—Douglas A. Kundrat

[57] ABSTRACT

A three state driver for an inductive load, e.g., a stator winding of a variable reluctance motor, allows the use of charge, idle, and discharge states in which a positive voltage, a short, and a reverse voltage are connected across the inductive load, respectively. An H-bridge comprising two electronic switches and two diodes is used to switch the inductive load voltages as commanded by a comparator circuit which compares the load current to a desired load current.

17 Claims, 6 Drawing Figures

THREE STATE DRIVER FOR INDUCTIVE LOADS

BACKGROUND AND SUMMARY OF THE INVENTION

A variable reluctance (VR) motor is a brushless electric motor having a rotor and multiple pairs of inductive stator windings. Torque, in the direction of a point of minimum reluctance, is exerted upon the rotor in an amount proportional to the amount of current flowing through a pair of stator windings. Rotor torque, speed, and rotational direction are controlled in a VR motor by controlling the amount of current flowing through selected pairs of stator windings.

VR motor control circuits which are constructed according to the prior art control the current flow through selected pairs of stator windings by alternating between a charge state and a discharge state. In the charge state, a voltage is impressed across the selected pair of windings until a desired current level is reached or slightly exceeded. A reverse voltage is then applied across the pair of stator windings to discharge the current flowing through the windings. In order to maintain a desired current through the windings, such a prior art control circuit must alternate between the charge and discharge states. The result is that the actual current is the average of the triangular current ripple which is created. This winding current ripple is highly disadvantageous because variations in rotor torque result and electromagnetic and acoustic noise is emitted.

In the illustrated preferred embodiment of the present invention a three state inductive load driver is used to control the current flow through each pair of stator windings in a VR motor. In a charge state the driver impresses a positive voltage across a pair of windings until a desired current level is reached. In a discharge state a reverse voltage is impressed across the windings until the current level has discharged to a desired level. An idle state, in which the windings are shorted, exists between the charge and discharge states. Since the current through a shorted ideal inductance is constant, the winding current during the idle state is constant except for decay due to minor resistive losses. Thus, a desired current level can be achieved and maintained with only a minimum of current ripple. Further, circuit complexity is minimized and the circuit operates at a low voltage and a high efficiency level.

DESCRIPTION OF THE PREFERRED EMBODIMENT

Figure 1:
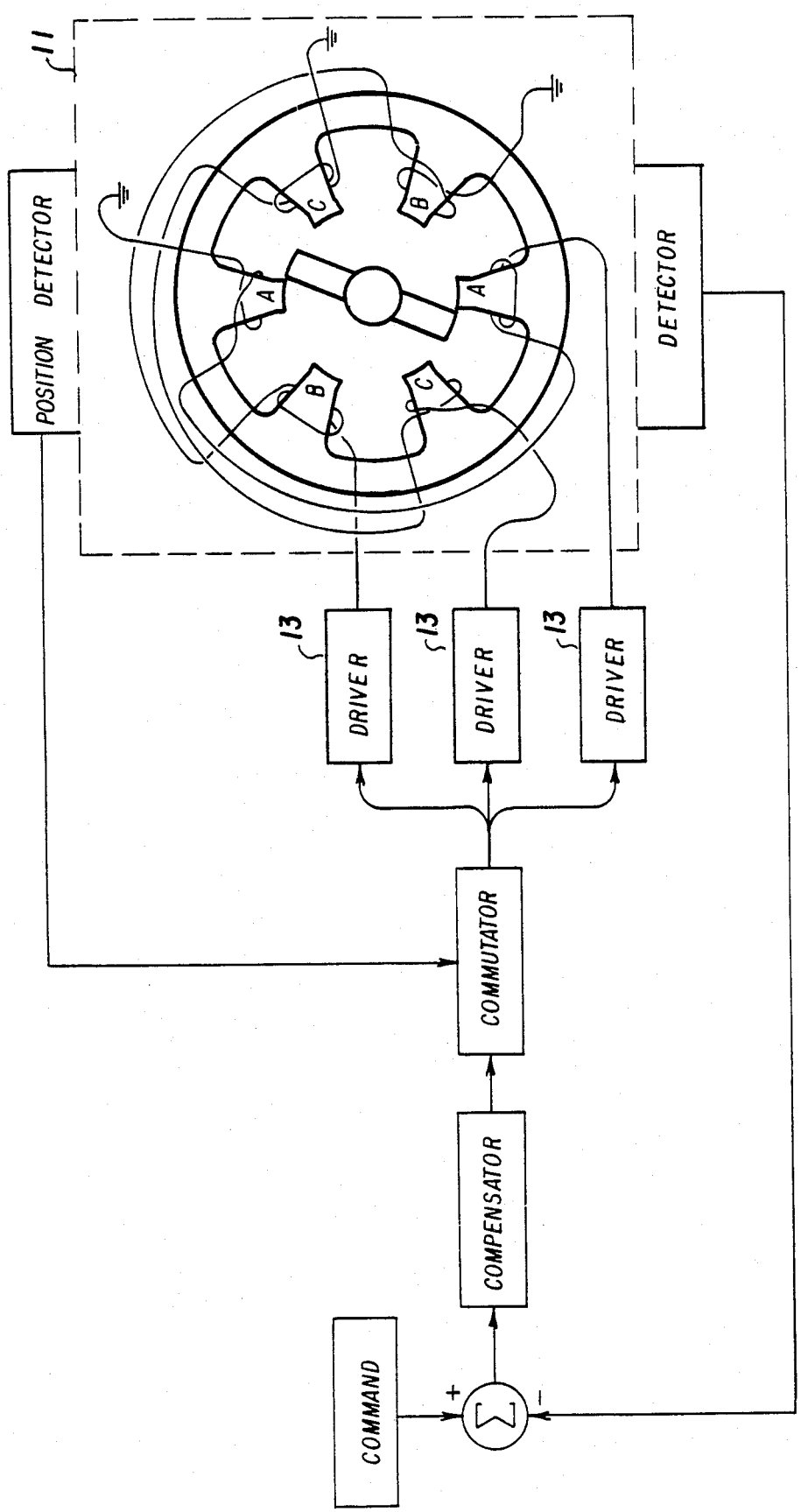
FIG. 1 is a block diagram of a variable reluctance motor which includes drivers constructed according to the preferred embodiment of the present invention.

FIG. 1 is a block diagram of a variable reluctance motor system having a motor 11 which is driven by three drivers 13. Each of drivers 13 is connected to one stator winding pair (AA, BB, CC) of motor 11 to control the winding current and, thereby, to control the torque, speed, and position of the rotor.

Figure 2:
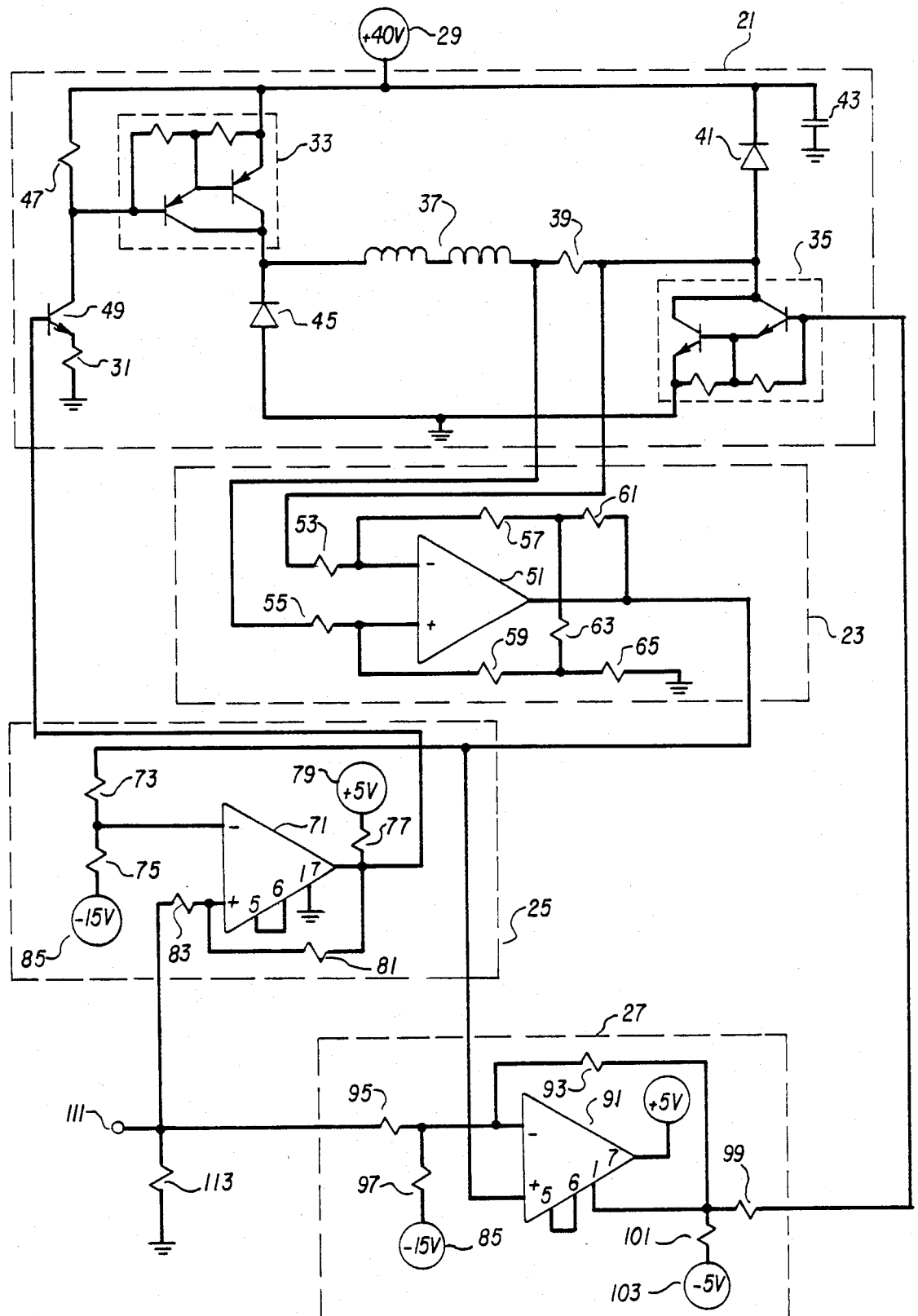
FIG. 2 is a schematic diagram of a driver circuit which is constructed according to the preferred embodiment of the present invention.

In FIG. 2, there is shown a schematic diagram of a preferred embodiment of driver 13 which is suitable for fabrication from discrete components. A bridge 21 includes two electronic switches (Darlington transistor pairs) 33 and 35 which control the application of voltage from a source 29 to a load 37. Current flow through load 37 is sensed by a resistor 39 and a sense circuit 23 and this information is used by two comparator circuits 25 and 27 to selectively open and close two switches 33 and 35.

High current +40 volt source 29 is connected to a filter capacitor 43 which comprises, e.g., a 270 microfarad, 75 volt capacitor. A diode 41, which may comprise a six ampere silicon device, connects source 29 to load 37 through sense resistor 39. Sense resistor 39 is also connected to ground through the collector-emitter path of switch 35 which comprises a high gain, high current device such as a Texas Instruments TIP-101 Darlington pair. Source 29 is connected to load 37 by switch 33 and a diode 45 connects load 37 to ground. Switch 33 comprises a high gain, high current device such as a Texas Instruments TIP-106 Darlington pair and diode 45 comprises a three ampere silicon device. Load 37, which may be any inductive device but which is here depicted as a winding pair of variable reluctance motor 11 depicted in FIG. 1, is connected from the collector of switch 33 to the collector of switch 35. A sense resistor 39, which is herein depicted as a one ohm, five watt, resistor, is connected between load 37 and the collector of switch 35.

An operational amplifier (op amp) 51, which may comprise, for example, a National Semiconductor LF356H operational amplifier, receives the differential voltage across sense resistor 39. One end of resistor 39 is connected to the inverting input of op amp 51 through a resistor 53. The other end of resistor 39 is connected to the non-inverting input of op amp 51 through a resistor 55. Feedback around op amp 51 is provided by a resistor 57, a resistor 59, a resistor 61, a resistor 63, and a resistor 65. In the circuit shown in FIG. 2, resistors 53 and 55 are 15 kilohm resistors,, resistors 57, 59, 61, and 65 are 2 kilohm resistors, and resistor 63 is a 500 ohm resistor.

A comparator 71, which may comprise a National Semiconductor LM311H device, receives the output of op amp 51 at an inverting input from a resistive divider which includes a source 85 and resistors 73 and 75. The non-inverting input of comparator 71 receives, by way of a resistive divider including resistors 83 and 113, a voltage presented at an input 111. Positive feedback is provided around comparator 71 through resistor 81. The output of comparator 71 is connected to a supply 79 through a resistor 77. In the circuit depicted in FIG. 2, pins 5 and 6 of comparator 71 are tied together and pin 1 is grounded; source 85 is set at −15 volts; resistor 73 is a 5 kilohm resistor; resistor 75 is a 300 kilohm resistor; resistor 83 is a 4.5 kilohm resistor; resistor 113 is a 2 kilohm resistor; resistor 81 is a 196 kilohm resistor; resistor 77 is a 350 ohm resistor; and, supply is set at +5 volts. The result is that the output of comparator 71 can vary from 0 to +5 volts.

The output of comparator 71 is also connected to the base of a transistor 49 which may comprise any of a number of well known high voltage breakdown switching transistors. The collector of transistor 49 is connected to source 29 through a resistor 47, which is 140 ohms in the circuit of FIG. 2, and is also connected to the base of switch 33. The emitter of transistor 49 is connected to ground via a resistor 31, which may comprise a 200 ohm resistor. Thus, when the output of comparator 71 is low (0 volts), transistor 49 is turned off and switch 33 is turned off (open) through resistor 47. Conversely, when the output of comparator 71 is high (+5 volts), transistor 49 is turned on and switch 33 is turned on (closed).

The non-inverting input of a comparator 91, which may comprise a National Semiconductor LM311H device, is connected to an output of op amp 51. An inverting input of comparator 91 is connected to input 111 via a resistor 95 which is depicted as a 4.5 kilohm resistor herein. The inverting input of comparator 91 is also connected to the −15 volt source 85 through a resistor 97 which may comprise, for example, a 750 kilohm resistor. Negative feedback around comparator 91 is provided by a resistor 93. The output of comparator 91 is connected to a source 103 through a resistor 101 and is also connected to the base of switch 35 through a resistor 99. In the circuit shown in FIG. 2, resistor 93 is a 150 kilohm resistor, resistor 99 is a 400 ohm resistor, resistor 101 is a 1 kilohm resistor, and source 103 is set at −5 volts. Further, it is important to note that pins 5 and 6 of comparator 91 are tied together, pin 7 is connected to source 79, and the output is taken from pin 1. The effect of these connections is that comparator 91 generates an inverted output that can vary from +5 volts to −5 volts at a rate of many kilohertz.

Figure 3A:
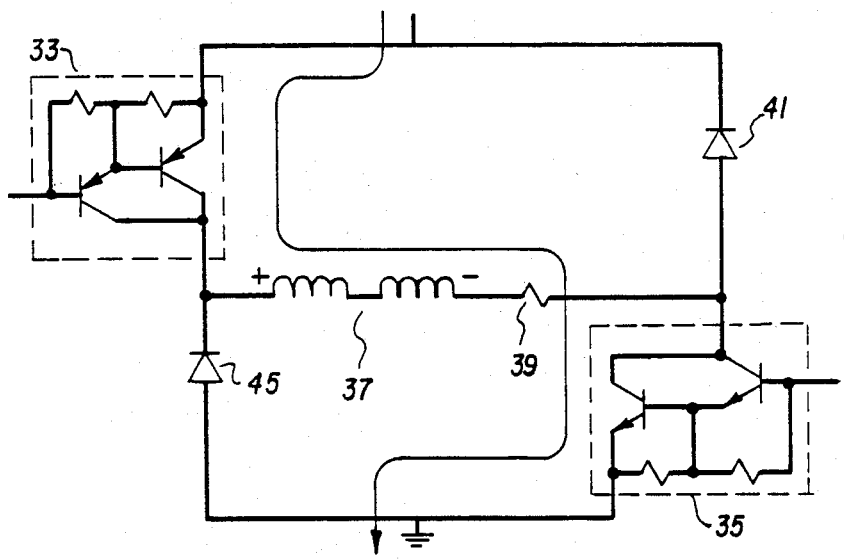
FIGS. 3A–C depict the current paths in the driver circuit of FIG. 2 during the charge, idle, and discharge states, respectively.
Figure 3B:
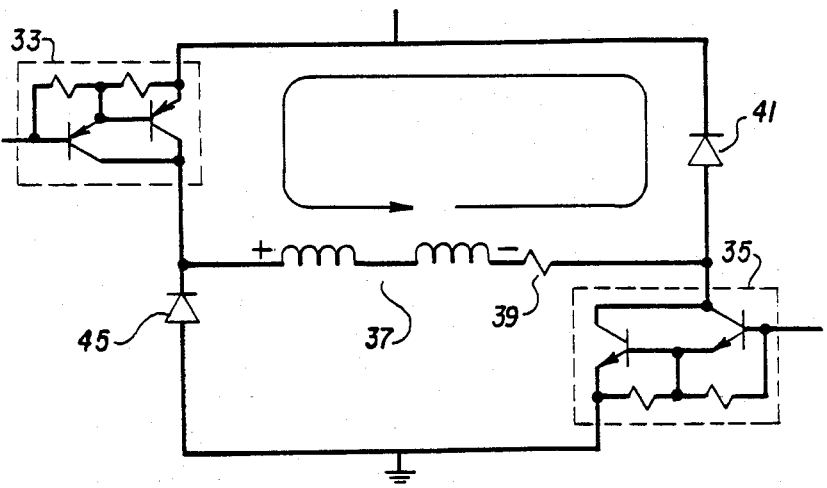
Figure 3C:
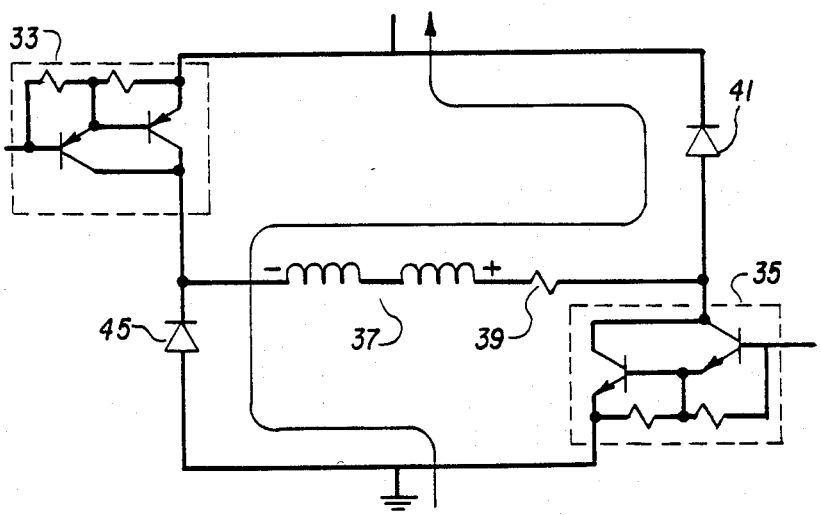

The operation of the circuit depicted in FIG. 2 may be better understood with additional reference to FIGS. 3A–C which depict current paths within bridge 21 during the charge, idle, and discharge states, respectively. The current-voltage relationship of inductive load 37 is defined by the differential equation $v = L(di/dt)$. Thus, the current through load 37 increases or decreases exponentially if a fixed voltage is impressed across the load and tends to remain constant if the ends of load 37 are shorted together.

In the charge state, shown in FIG. 3A, switches 33 and 35 are closed, thereby impressing +40 volts across load 37. Therefore, the current flow depicted increases exponentially from zero and reaches 3 amperes in a few milliseconds. Once the desired current through load 37 has been attained, switch 25 is opened so that the idle state depicted in FIG. 3B is entered. The ends of load 37 are shorted together and the current depicted in FIG. 3B tends to remain constant except for decay due to resistive losses. Finally, when it is desired to decrease the current flowing in load 37, both switches 33 and 35 are opened so that the discharge state depicted in FIG. 3C is entered. In this state, +40 volts is applied across load 37 in a polarity opposite to that in the charge state. Thus, the current flowing through load 37 decreases exponentially.

The current flowing through load 37 is sensed by sense circuit 23 and this information is used to determine when to change states. Because neither end of sense resistor 39 is grounded, it is necessary to measure the voltage across sense resistor 39 differentially. The resistor circuit around op amp 51 is set up in a conventional manner to measure the differential voltage across sense resistor 39. Resistors 57, 59, and 63 are used so that sense circuit 23 does not operate in an attenuating mode. For the resistor values given above with reference to FIG. 2, sense circuit 23 generates a zero volt output for a zero current flow through sense resistor 39 and a +4 volt output for a three ampere current.

Comparator circuit 25 receives both the output of sense circuit 23 and a command voltage at input 111 and determines when to open and close switch 33. The user presents the command voltage at input 111 to control the current flow through load 37. In the circuit of FIG. 2, 0 volts impressed at input 111 commands a zero current flow and +4 volts commands a 3 ampere current flow through load 37. Comparator 71 compares the command voltage at input 111 to the sense voltage from sense circuit 23 and applies zero volts to the base of transistor 49 when the sense voltage is greater than the command voltage and applies +5 volts when the command voltage exceeds the sense voltage. Thus, transistor 49 closes switch 33 (turns on the Darlington pair) when the output of comparator 71 is high and opens switch 33 when the output is low.

In a similar fashion, comparator circuit 27 opens and closes switch 35. It is important to note that the output of comparator 91 has been inverted to increase switching speed with the result that the output is +5 volts when the command voltage at input 111 exceeds the sense voltage from sense circuit 23. The output of comparator 91 is −5 volts when the sense voltage exceeds the command voltage. Thus, switch 35 is closed (Darlington pair turned on) when the output of comparator circuit 27 is high and switch 35 is opened when the output is low.

The duration of the idle state is dependent upon the width of the idle band in which switch 33 is closed and switch 35 is open. Supply 85 and resistors 73, 75, 95, and 97 are used to offset the inputs to comparators 71 and 91 so that, with the values given above with reference to FIG. 2, the idle band extends approximately 200 millivolts from the lower edge to an upper edge and the output of comparator 91 changes before the output of comparator 71. It is also necessary to add some hysteresis to comparator circuits 25 and 27 to provide noise immunity and this is done with feedback resistors 81 and 93.

By way of example, if it is assumed that it is desired to have the current through load 37 increase from 0 to 3 amperes, the user would change the command voltage at input 111 from 0 to +4 volts. This would cause both of switches 33 and 35 to close and the current through load 37 would increase exponentially. When the current reaches 3 amperes (and, consequently, the sense voltage reaches +4 volts), the output of comparator 91 goes low and switch 35 is opened. Bridge circuit 35 remains in the idle state as the current decays slowly due to resistive losses. When the current has decayed sufficiently so that the sense voltage has decreased by 200 millivolts, the output of comparator 91 goes high and the charge state is reentered. In this example, the circuit of FIG. 2 will remain in the idle state for about 80% of the time and will be in the charge state the other 20% of the time.

To complete the example, if it is desired to decrease the current through load 37 from 3 amperes to 0 amperes, the user changes the command voltage at input 111 from +4 volts to 0 volts. This causes both of switches 33 and 35 to open and the discharge state is entered with a reverse 40 volts applied across load 37. When the zero current level is reached, the idle state is reentered.

Figure 4:
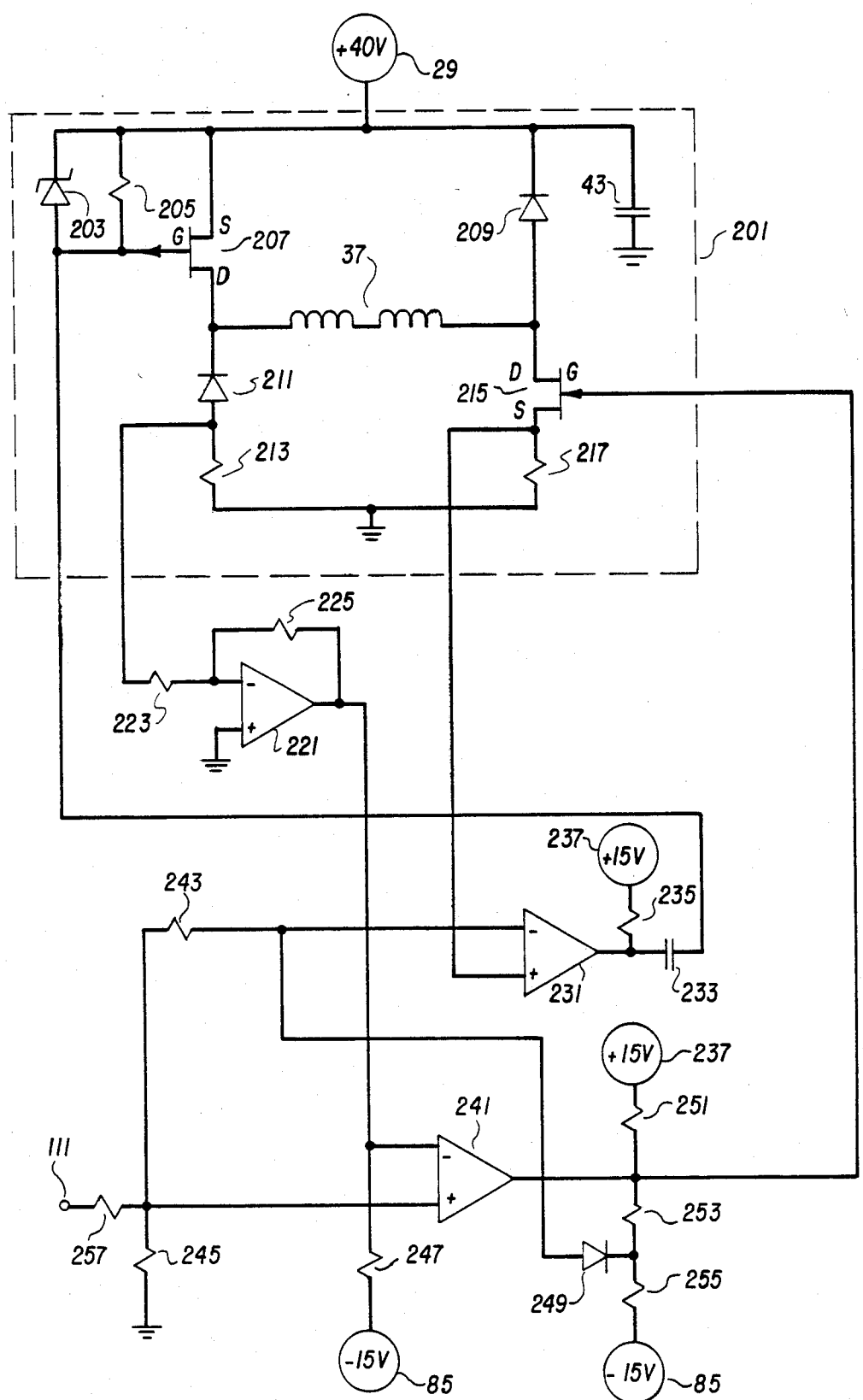
FIG. 4 is a schematic diagram of a driver circuit constructed according to an alternate preferred embodiment of the present invention.

In FIG. 4, there is shown another preferred embodiment of the present invention in which hybrid circuitry is utilized. Source 29 is connected to capacitor 43 and to the cathode of a diode 209 within a bridge circuit 201. Diode 209 comprises a three ampere silicon diode. Source 29 is also connected to the cathode of a zener diode 203, which may comprise a 16 volt device, a resistor 205, and the source of a FET 207. Resistor 205 may comprise a 1 megohm resistor and FET 207 may be, for example, an International Rectifier Corp. IRF-9530 MOSFET device. Load 37, which is herein depicted as a winding pair of driver 13 shown in FIG. 1, is connected between the anode of diode 209 and the drain of FET 207. One end of load 37 is connected to ground through a reverse biased diode 211 and a sense resistor 213. Diode 211 comprises a three ampere Schottky diode and resistor 213 is a 0.1 ohm resistor. The other end of load 37 is connected to the drain of a FET 215 which may comprise, e.g., an International Rectifier Corp. IRF-530 MOSFET device. The source of FET 215 is connected to ground through a sense resistor 217 which is identical to resistor 213.

The current sensing function is greatly simplified by the fact that sense resistors 213 and 217 are both grounded at one end. An operational amplifier (op amp) 221, which may comprise a National Semiconductor LM-324A device, and resistors 223 and 225, both of which may comprise 1 kilohm resistors, function as an inverter to reverse the polarity of the voltage sensed by sense resistor 213. The inverting input of op amp 221 is connected through resistor 223 to the positive end of sense resistor 213. The non-inverting input of op amp 221 is grounded and negative feedback is provided to the inverting input by resistor 225.

A comparator 231 controls FET 207 and the output of comparator 231 is A.C. coupled through a capacitor 233, which may comprise for example a 0.01 microfarad capacitor, to the gate of FET 207, resistor 205, and the anode of zener diode 203. The output of comparator 231, which may comprise one-half of a National Semiconductor LM-319 dual comparator, is connected to a supply 237 through a resistor 235. Supply 237 is set at +15 volts and resistor 235 is a 1 kilohm resistor with the result that the output of comparator 231 can vary from ground to +15 volts. The non-inverting input of comparator 231 is connected to the positive end of sense resistor 217. The inverting input of comparator 231 is connected through a resistor 243 and a resistor 257 to input 111. Resistor 243 is a 51.1 kilohm resistor and resistor 257 is a 13 kilohm resistor. The result is that the output of comparator 231 goes low, and FET 207 is turned on via resistor 205, when the divided command voltage received at the inverting input exceeds the sense resistor 217 voltage.

A comparator 241 is used to control FET 215. The output of comparator 241, which may comprise one-half of a National Semiconductor LM-319 dual op amp, is connected to the gate of FET 215. The output is also connected, through a resistor 251, which may comprise a 1 kilohm resistor, to supply 237 and is allowed to swing from ground to +15 volts. The inverting input of comparator 241 is connected to the inverted output of op amp 221 and is also connected, through a resistor 247, which may comprise a 6 kilohm resistor, to supply 85. The non-inverting input of comparator 241 is connected to input 111 via the resistive divider consisting of resistor 257 and a resistor 245 which may be a 1 kilohm resistor.

Sufficient hysteresis to provide adequate noise immunity is provided by hysteresis which is internal to comparators 231 and 241. Additional hysteresis is provided by a resistor 253 and a resistor 255, connected from the output of comparator 241 to supply 85, and by silicon diode 249 connected from the inverting input of comparator 231 to resistor 253. An additional function of diode 249 is to turn off FET 207 when the output of comparator 241 is low. In the circuit shown in FIG. 4, resistor 253 is a 383 kilohm resistor and resistor 255 is a 464 kilohm resistor.

Since the sense voltages used in the circuit of FIG. 4 are one tenth of the sense voltage used in the circuit of FIG. 2, much less offset is required to define an adequate idle band. Roughly 50 millivolts of offset is provided by supply 85 and resistor 247 which are connected to the inverting input of comparator 241. Except for minor differences due to the facts that the idle current flow is clockwise in the lower half of the H-bridge and that a modified sensing scheme is used, the circuit depicted in FIG. 4 operates the same as the circuit depicted in FIG. 2.

We claim:

1. A driver circuit, coupled to a voltage supply, for controlling a load current through an inductive load in response to a voltage command signal representing a desired load current, the driver circuit comprising:
   sensing means, coupled to the load, for measuring the load current and for presenting at an output a sense signal representing said load current;
   first switch means, coupled between the supply and one end of the load, for selectively coupling the one end of the load to the supply in response to a first control signal;
   second switch means, coupled between the supply and an other end of the load, for selectively coupling the other end of the load to the supply in response to a second control signal;
   first comparator means, having a first input for receiving the command signal and a second input coupled to the sensing means output for receiving the sense signal, said first comparator means having an output coupled to the first switch means and being operative for comparing the sense signal and the command signal and for selectively presenting a first open control signal or a first short control signal to the first switch means to cause the first switch means to open or short, respectively;
   second comparator means, having a first input for receiving the command signal and a second input coupled to the sensing means output for receiving the sense signal, said second comparator means having an output coupled to the second switch means and being operative for comparing the sense signal and the command signal and for selectively presenting a second open control signal or a second short control signal to the second switch means to cause the second switch means to open or short, respectively;
   a first diode having an anode connected to ground and a cathode connected to the one end of the load; and
   a second diode having an anode connected to the other end of the load and a cathode connected to the supply.

2. A driver circuit as in claim 1, wherein:
   the first comparator means is operative for presenting the first open control signal and the second comparator means is operative for presenting the second open control signal if the load current is greater than an upper edge of a desired idle band about the desired load current;

the first comparator means is operative for presenting the first short control signal and the second comparator means is operative for presenting the second short control signal if the load current is less than a lower edge of the desired idle band;

the first comparator means is operative for presenting the first short control signal and the second comparator means is operative for presenting the second open control signal if the load current is within the desired idle band.

3. A driver circuit as in claim 1, wherein:

the first comparator means is operative for presenting the first open control signal and the second comparator means is operative for presenting the second open control signal if the load current is greater that an upper edge of a desired idle band about the desired load current;

the first comparator means is operative for presenting the first short control signal and the second comparator means is operative for presenting the second short control signal if the load current is less than a lower edge of the desired idle band; and the first comparator means is operative for presenting the first open control signal and the second comparator means is operative for presenting the second short control signal if the load current is within the desired idle band.

4. A driver circuit as in claim 2, wherein the first and second switch mean comprise first and second Darlington transistor pair circuits, respectively.

5. A driver circuit as in claim 2, wherein the first and second switch mean comprise first and second field effect transistors, respectively.

6. A driver circuit as in claim 4, wherein the sensing means comprises:

a first sense resistor connected between the other end of the load and the second Darlington pair circuit; and a differential amplifer having a first input coupled to one end of the first sense resistor, a second input coupled to the other end of the first sense resistor, and an output coupled to the second inputs of the first and second comparator means.

7. A driver circuit as in claim 5, wherein the sensing means comprises:

a second sense resistor connected between the first diode and ground; and a third sense resistor connected between the second diode and ground.

8. A driver circuit as in claim 7, wherein the sensing means further comprises an inverting means having an input coupled to the anode of the first diode and an output coupled to the second input of the first comparator means.

9. A driver circuit as in claim 4, wherein the load comprises a stator winding of a variable reluctance motor.

10. A driver circuit as in claim 5, wherein the load comprises a stator winding of a variable reluctance motor.

11. A driver circuit as in claim 3, wherein the first and second switch means comprise first and second Darlington transistor pair circuits, respectively.

12. A driver circuit as in claim 3, wherein the first and second switch means comprise first and second field effect transistors, respectively.

13. A driver circuit as in claim 11, wherein the sensing means comprises:

a first sense resistor connected between the other end of the load and the second Darlington pair circuit; and a differential amplifier having a first input coupled to one end of the first sense resistor, a second input coupled to the other end of the first sense resistor, and an output coupled to the second inputs of the first and second comparator means.

14. A driver cricuit as in claim 12 wherein the sensing means comprises:

a second sense resistor connected between the first diode and ground; and a third sense resistor connected between the second diode and ground.

15. A driver circuit as in claim 14, wherein the sensing means further comprises an inverting means having an input coupled to the anode of the first diode and an output coupled to the second input of the first comparator means.

16. A driver circuit as in claim 11, wherein the load comprises a stator winding of a variable reluctance motor.

17. A driver circuit as in claim 12, wherein the load comprises a stator winding of a variable reluctance motor.

* * * * *

UNITED STATES PATENT AND TRADEMARK OFFICE
CERTIFICATE OF CORRECTION

PATENT NO. : 4,496,886

DATED : January 29, 1985

INVENTOR(S) : Gary B. Gordon, Robert Joy and Michael J. Lee

It is certified that error appears in the above—identified patent and that said Letters Patent is hereby corrected as shown below:

Column 3, line 47, "switch 25" should read -- switch 35 --;

Column 4, line 36, "volts from the lower" should read -- volts from a lower --;

Column 5, line 30, "The non-inverting input" should read -- The inverting input --;

Column 7, line 19, "greater that" should read -- greater than --;

Column 8, line 32, "cricuit" should read -- circuit --.

Signed and Sealed this

Thirtieth Day of July 1985

[SEAL]

Attest:

DONALD J. QUIGG

Attesting Officer     Acting Commissioner of Patents and Trademarks